United States Patent
Kannanari

(10) Patent No.: US 10,621,576 B1
(45) Date of Patent: Apr. 14, 2020

(54) MOBILE PAYMENTS USING PAYMENT TOKENS

(71) Applicant: Amazon Technologies, Inc., Reno, NV (US)

(72) Inventor: Ahamed Kannanari, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 1708 days.

(21) Appl. No.: 14/222,452

(22) Filed: Mar. 21, 2014

Related U.S. Application Data

(63) Continuation of application No. 13/292,423, filed on Nov. 9, 2011, now Pat. No. 8,682,802.

(51) Int. Cl.
*G06Q 20/36* (2012.01)
*G06Q 20/40* (2012.01)

(52) U.S. Cl.
CPC ....... *G06Q 20/3674* (2013.01); *G06Q 20/401* (2013.01); *G06Q 2220/00* (2013.01)

(58) Field of Classification Search
CPC ............. G06Q 20/3674; G06Q 20/401; G06Q 2220/00
USPC .......................................................... 705/65
See application file for complete search history.

(56) References Cited

U.S. PATENT DOCUMENTS

| | | | |
|---|---|---|---|
| 6,422,462 B1 | 7/2002 | Cohen | |
| 8,229,852 B2 | 7/2012 | Carlson | |
| 8,380,177 B2 | 2/2013 | Laracey | |
| 8,412,631 B2 | 4/2013 | Crofts et al. | |
| 2008/0243702 A1* | 10/2008 | Hart | G06Q 20/3672 705/66 |
| 2008/0319905 A1* | 12/2008 | Carlson | G06Q 20/385 705/44 |
| 2009/0210315 A1* | 8/2009 | Jean | G06Q 20/12 705/26.1 |

(Continued)

FOREIGN PATENT DOCUMENTS

| | | |
|---|---|---|
| WO | 2008/093140 | 8/2008 |
| WO | 2010/126509 A2 | 11/2010 |

(Continued)

OTHER PUBLICATIONS https://www.forumcu.com/Holds, retrieved on Jun. 14, 2017, 4 pages.*

(Continued)

*Primary Examiner* — James D Nigh
(74) *Attorney, Agent, or Firm* — Lee & Hayes, P.C.

(57) ABSTRACT

A user may request a payment token from a host. The payment token may be a unique one-time use identifier linked to one or more payment accounts associated with the user. The payment token may be subject to conditions of use. To redeem the payment token, the user device may generate an image code to visually present the payment token for access by a recipient's camera. The recipient may then record the image code. The user may also provide a security identifier to the recipient. The recipient may then transmit the image code and the security identifier to the host as a payment request. The host may verify the payment request and verify compliance with any associated conditions. When the payment token is valid, funds are available, and the conditions are satisfied, then the host may transfer the funds to an account of the recipient.

20 Claims, 6 Drawing Sheets

(56) References Cited

U.S. PATENT DOCUMENTS

| | | | | |
|---|---|---|---|---|
| 2010/0042539 | A1* | 2/2010 | Dheer | G06Q 20/10 |
| | | | | 705/40 |
| 2010/0133334 | A1* | 6/2010 | Vadhri | G06Q 20/367 |
| | | | | 235/379 |
| 2010/0276484 | A1* | 11/2010 | Banerjee | G06Q 30/06 |
| | | | | 235/379 |
| 2011/0208659 | A1 | 8/2011 | Easterly et al. | |
| 2011/0251892 | A1 | 10/2011 | Laracey | |
| 2012/0028609 | A1* | 2/2012 | Hruska | G06Q 20/3674 |
| | | | | 455/411 |
| 2012/0150669 | A1 | 6/2012 | Langley et al. | |
| 2012/0209630 | A1 | 8/2012 | Ihm et al. | |
| 2012/0290478 | A1 | 11/2012 | Crofts et al. | |

FOREIGN PATENT DOCUMENTS

| | | | | |
|---|---|---|---|---|
| WO | WO 2010126509 | A2 * | 11/2010 | G06Q 20/10 |
| WO | WO-2010126509 | A2 * | 11/2010 | G06Q 20/40 |
| WO | 2010/126509 | | 12/2011 | |

OTHER PUBLICATIONS https://www.forumcu.com/Holds, retrieved on Jun. 14, 2017, 4 pages (Year: 2017).*

Office action for U.S. Appl. No. 13/292,423, dated Nov. 6, 2012, Kannanari, "Mobile Payments Using Payment Tokens", 18 pages.

Office action for U.S. Appl. No. 13/292,423, dated Mar. 7, 2013, Kannanari, "Mobile Payments Using Payment Tokens", 23 pages.

Office action for U.S. Appl. No. 13/292,423, dated Jun. 19, 2013, Kannanari, "Mobile Payments Using Payment Tokens", 26 pages.

\* cited by examiner

MOBILE PAYMENTS USING PAYMENT TOKENS

RELATED APPLICATIONS

This Application claims priority to U.S. patent application Ser. No. 13/292,423, filed on Nov. 9, 2011, which is incorporated herein by reference in its entirety.

BACKGROUND

Traditional methods of conducting financial transactions commonly consist of an exchange of money using paper currency, checks, payment cards (e.g., credit cards, debit cards, etc.) and electronic transfers involving a financial institution. In more recent years, an increasing amount of financial transactions occur electronically and do not require actual presentation of payment cards. Some financial transactions may be processed over computer networks, such as the Internet, while other transactions may be processed using telephone-based systems or systems implemented in brick-and-mortar locations. Increasingly, a number of financial transactions are conducted by mobile telephones. However, these financial transactions often require specialized hardware, include limited user options, have time consuming processes, or are otherwise ill-suited for quick payments in a brick-and-mortar location.

In a typical transaction, information about each party is typically exchanged to facilitate the financial transaction. Some of this information may be personal or private information that a person may not desire to share with a merchant or a stranger. For example, a customer typically has to provide one or more of a payment account number, a username, a password, or other sensitive information during execution of an electronic payment. In addition, payment information stored or accessible on a mobile phone is susceptible to misuse when the mobile phone is lost or misplaced by a user.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
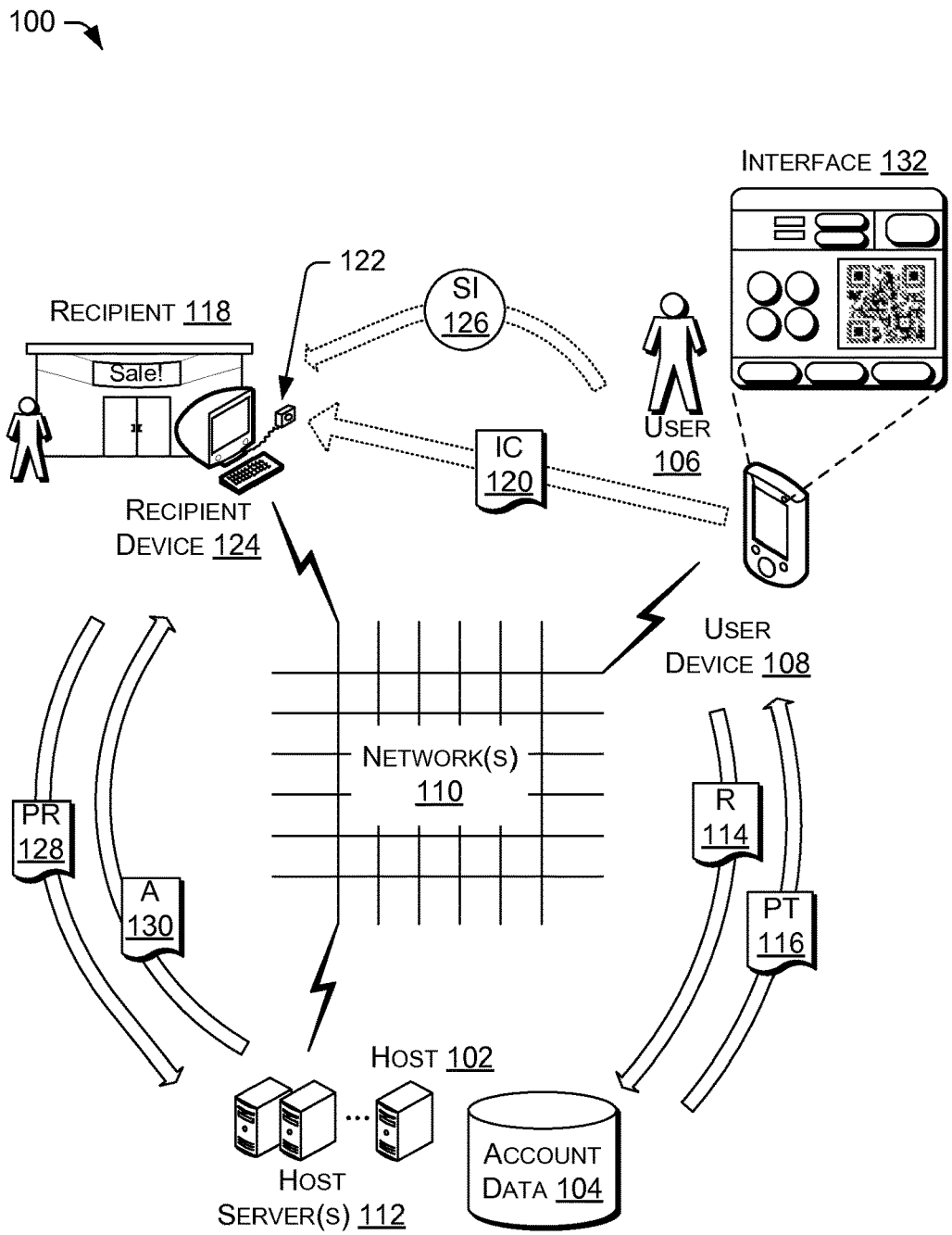
FIG. 1 is a schematic diagram of an illustrative computing environment usable to conduct mobile payments using payment tokens.

This disclosure is directed to, in part, providing a payment using payment tokens. A user may request a payment token from a host using a user device such as a mobile telephone, personal computer, or other electronic device. The request may include user credentials, which are transmitted to the host. The host may issue the payment token to the user device in response to a valid request (correct credentials, available funds, etc.). In some embodiments, the payment token may be a unique one-time use identifier (string of numbers, characters, and/or symbols, etc.) linked to one or more payment accounts associated with the user. The payment token may include an expiration time and may be subject to one or more conditions of use, which may be created by the user and/or the host.

The user may redeem the payment token during a transaction with a recipient (merchant, another person, an entity, etc.). To redeem the payment token, the user device may generate an image code to visually present the unique identifier of the payment token for access by a scanner or camera. For example, the user device may create a quick response (QR) code for the unique identifier. The merchant, person, or other entity may record the image code or data included in the image code using a camera, scanner, or other suitable hardware. The user may also provide a personal identification number (PIN), password, or other security measure to the recipient before or after providing the image code.

The recipient may then transmit the image code and any security information to the payment host as a payment request. The payment request may be encrypted by the user device, the recipient, or both. The host may decrypt the payment request and then determine whether the payment token is valid, determine whether an associated account has the requested funds, and/or determine whether the payment request is in compliance with any conditions associated with the payment token. When the payment token is valid, the funds are available, and the conditions are satisfied, then the host may transfer funds to an account of the recipient.

As discussed above, the payment tokens may include an expiration time. For example, a user may request a payment token while standing in line at a merchant's brick-and-mortar store location. The user may request that the payment token expire in a relatively short amount of time, such as in ten minutes or some other amount of time. The user may also request a value of the payment token to be a specified amount, such as twenty dollars ($20) or any other amount. When the user starts a transaction with the merchant to purchase goods and/or services, the user may redeem to a merchant (or other recipient) the payment token as an image code to satisfy a balance due in the transaction. The payment token may be redeemed by the user for up to the value of the payment token and before the payment token expires. In the above example, the user may use the payment token for a purchase up to twenty dollars that occurs within ten minutes of the creation of the payment token (assuming the user's account has at least twenty dollars available in the account). By placing limits on a value of the payment token and providing an expiration time, the user may thwart misuse of payment tokens if the user loses or misplaces his or her mobile telephone. The payment tokens also enable the user to quickly provide payment information in a secure manner that may be communicated to the merchant or other recipient using commonly used hardware (e.g., a scanner or camera, etc.).

The techniques and systems described herein may be implemented in a number of ways. Example implementations are provided below with reference to the following figures.

Illustrative Environment

FIG. 1 is a schematic diagram of an illustrative computing environment usable to conduct mobile payments using payment tokens. The environment may include a host 102 that stores account data 104 for a user 106. The account data 104 may include one or more payment accounts (e.g., payment instruments, payment types, etc.), which may provide the user 106 with access to credit card information, bank account information (e.g., checking account(s), savings account(s), investment account(s), etc.), stored value cards, gift cards, or other types of payment instruments. The user 106 may make payments with his or her payment account(s) and/or receive payments from other people using the payment account(s). In some embodiments, the user 106 may initiate a payment using a user device 108 that transfers funds from a payment account to another party (recipient), such as a merchant. The user device 108 may be a mobile telephone, a smart phone, a tablet computer, a laptop computer, a netbook, a personal digital assistance (PDA), a gaming device, a media player, or any other mobile computing device that includes a display and can connect to a network(s) 110 to exchange information with host servers 112 of the host 102.

In accordance with embodiments, the user 106 may transmit a request 114 to the host servers 112 to request a payment token. The host servers 112 may authenticate the request 114, such as to verify user credentials and/or account information. The host servers 112 may then transmit a payment token 116 to the user device 108 in response to the request 114. The payment token 116 can be a numeric or an alpha-numeric string of a specified length. In some embodiments, the payment token 116 may also include special characters. The payment token 116 may be subject to an expiration time and/or conditions of use, which may be stored by the host servers 112 in the account data 104. In some embodiments, the payment token 116 may be encrypted by the host servers 112.

The user 106, via the user device 108, may redeem the payment token 116 to complete a purchase with a recipient 118, such as a merchant in a brick-and-mortar location, another user having an electronic device with image acquiring hardware (e.g., a camera, a scanner, etc.), or other people or entities. The user device 108 may convert the payment token 116 into an image code 120. The image code may be a QR code, a bar code, or other image or text based information that can be received by another computing device. In some embodiments, the user device 108 may encrypt the payment token 116 prior to generating the image code 120.

The user device 108 may then display the image code on a display, which may be made visible to an image acquisition device 122 such as a scanner, a camera, or another image acquisition device. For example, the recipient 118 may have a recipient device 124 that includes the image acquisition device 122.

In some embodiments, the user 106 may provide a security identifier 126 to the recipient device 124. The security identifier 126 may be a personal identification number (PIN), a password, or other security data. The security identifier 126 may be input directly to the recipient device 124 using a keypad or other input device provided by the recipient or may be transmitted from the user device 108 to the recipient device. For example, the user 106 may enter the security identifier 126 on her user device and then transmit the security identifier with the payment token in the image code 120, possibly after encrypting the data. In some instances, the user 106 may have to enter the security identifier manually using a keypad or input device to reduce a risk of redemption by an unauthorized user.

The recipient device 124 may convert the image code 120 into alphanumeric data (e.g., ASCII numerals, etc.) and may append the security identifier 126 (if necessary), which may then be encrypted by the recipient device. The recipient device 124 may transmit the encrypted data as a payment request 128 to the host server 112. The host servers 112 may receive the payment request 128 and then decrypt the payment request to identify at least the payment token 116 and the security identifier 126. The host servers 112 may then associate the payment token 116 with the account data 104 to determine whether the requested funds are available (e.g., adequate balance, within an available credit limit, etc.), whether the payment token is valid (e.g., not expired, correct security identifier, etc.) and to determine whether any stored conditions are satisfied prior to providing an answer 130 to the recipient device. When the payment token 116 is valid and any conditions are satisfied, then the host servers 112 may complete the payment request and transmit the answer 130 that confirms a transfer of the payment request 128 to an account of the recipient. The account of the recipient may be included in the account data 104 or may be external to the host servers 112. When the payment token 116 is invalid and/or the conditions are not satisfied, the host servers 112 may transmit the answer 130 as a rejection of the payment request 128. The host servers 112 may also communicate the answer 130 to the user device 108.

The user 106 may interact with an interface 132 to request the payment token 116, spend (or redeem) the payment token, or otherwise manage existing payment tokens. For example, the user 106 may create a number of payment tokens for use during a shopping trip. The user 106 may then spend the payment tokens before they expire similar to spending cash stored in a physical wallet. However, unlike cash, the payment tokens may be one-time-use tokens and expire after redemption to a recipient, such as the recipient 118. For example, the user 106 may create a payment token for twenty dollars and redeem this token to the recipient 118 to satisfy a transaction for $15.75. If the payment token is valid, as determined by the host servers 112, then the host servers will pay the recipient $15.75 using funds in an account of the user 106 that is associated with the payment token. The remaining balance on the token is then unusable by the payment token because the payment token is a one-time-use payment token and is now expired. To spend the balance of $4.25, the user 106 would have to create or use another payment token.

The network(s) 110 may include wired and/or wireless networks that enable communications between the various computing devices described in the environment 100. In some embodiments, the network(s) 110 may include local area networks (LANs), wide area networks (WAN), mobile telephone networks (MTNs), and other types of networks, possibly used in conjunction with one another, to facilitate communication between the various computing devices (i.e., the user device 108, the host servers 112, and/or the recipient device 124). The computing devices are described in greater detail with reference to the following figures.

Figure 2A:
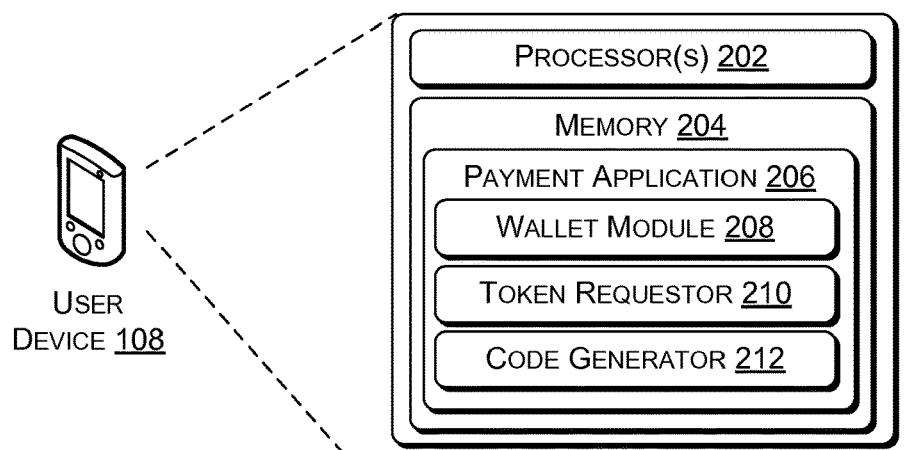
FIGS. 2a-2c are block diagrams of illustrative computing architecture of various components included in the computing environment of FIG. 1.
Figure 2B:
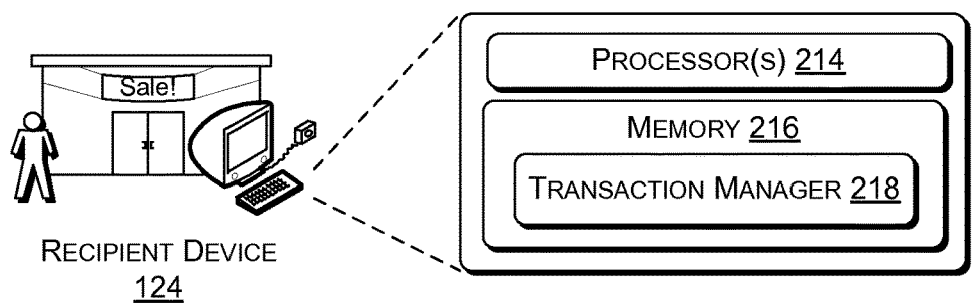
Figure 2C:
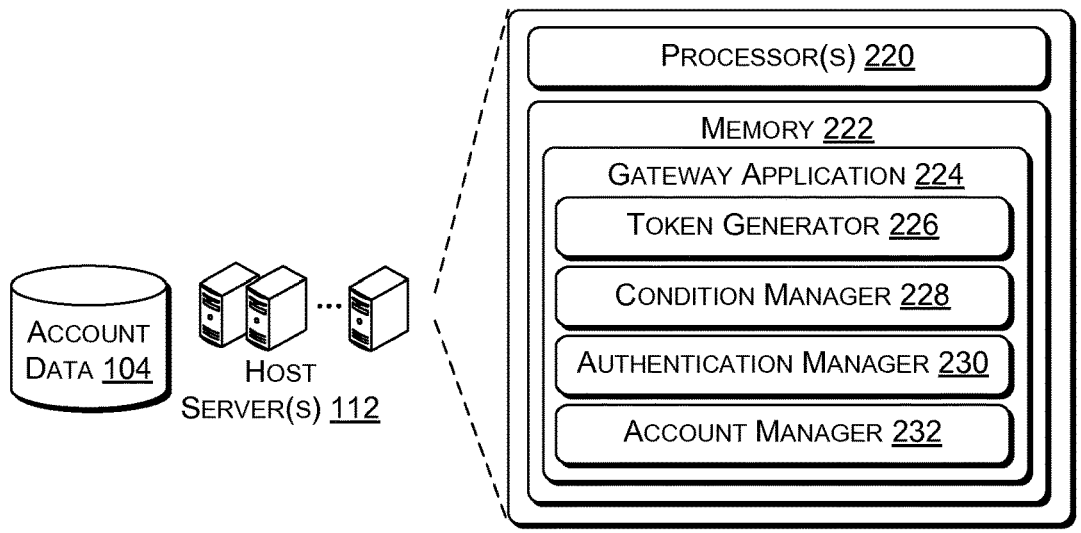

FIGS. 2a-2c are block diagrams of illustrative computing architecture of various components included in the computing environment of FIG. 1.

FIG. 2a shows illustrative computing architecture of the user device 108. The architecture may include processors(s) 202 and memory 204. The memory 204 may store various modules, applications, programs, or other data. The memory 204 may include instructions that, when executed by the processor(s) 202, cause the processors to perform the operations described herein for the user device 108. In some embodiments, the memory 204 may store a payment application 206 to facilitate creating (or obtaining), spending, and/or modifying a payment token. The payment application 206 may further include a wallet module 208, a token requestor 210, and a code generator 212. Each module is discussed in turn.

The wallet module 208 may provide the interface 132, which is further described with reference to FIGS. 5 and 6. The wallet module 208 may enable the user 106 to manage payment tokens. For example, the wallet module 208 may allow the user 106 to create a payment token, spend the payment token, and/or modify the payment token.

The token requestor 210 may request a payment token from the host servers 112. In some embodiments, the token requestor 210 may obtain and/or transmit user credentials, conditions, an expiration time, an amount, and/or other data to the host servers 112 with the request. In some embodiments, the token requestor 210 may be accessible via another user device different than the user device 108 such as a desktop computer or personal computer that may be used by the user 106 to request the payment tokens for the user device 108.

The code generator 212 may encrypt the payment token and generate an image code for the encrypted payment token, which is then displayed by the user device 108. The image code may be a quick response (QR) code, a bar code, and/or other types of image codes or codes that can be communicated to another device through use of an image acquisition device (e.g., still camera, video camera, etc.), a scanner, a laser reader, or other image reading devices.

FIG. 2b shows illustrative computing architecture of the recipient device 124. The architecture may include processors(s) 214 and memory 216. The memory 216 may store various modules, applications, programs, or other data. The memory 216 may include instructions that, when executed by the processor(s) 214, cause the processors to perform the operations described herein for the recipient device 124. In some embodiments, the memory 216 may store a transaction manager 218. The transaction manager 218 may facilitate receipt of the image code 120 and the security identifier 126. The transaction manager 218 may combine the image code 120 and the security identifier 126, which may then be encrypted and transmitted to the host servers 112 as the payment request 128. The transaction manager 218 may also receive messaging from the host servers 112 regarding an approval of the payment request or rejection of the payment request. In some embodiments, the transaction manager 218 may include a converter to convert the image code 120 into alphanumeric data.

FIG. 2c shows illustrative computing architecture of the host servers 112. The architecture may include processors(s) 220 and memory 222. The memory 222 may store various modules, applications, programs, or other data. The memory 222 may include instructions that, when executed by the processor(s) 220, cause the processors to perform the operations described herein for the host servers 112. In some embodiments, the memory 222 may store a gateway application 224 that facilitates transmission of the payment token to the user device and receipt of the payment token from the recipient 118. The gateway application 224 may further include a token generator 226, a condition manager 228, an authentication manager 230, and an account manager 232. Each module is discussed in turn.

The token generator 226 may receive the request 114 for the payment token from the user device 108. The request 114 may include user credentials (e.g., username, password, etc.), an amount, conditions, an expiration time and/or other data. The token generator 226 may verify the user credentials and availability of the amount in an associated user account. In some instances, the payment token may be associated with one or more particular payment instruments and/or payment types in the account. When the user credentials are correct and the amount is available, the token generator 226 may generate a unique payment token that is associated with the account and is subject to the conditions and expiration time. The token generator 226 may encrypt the payment token and then transmit the payment token to the user device 108. However, the condition information, expiration time, and other data may remain with the host servers 112 and may or may not be transmitted to the user device 108.

The condition manager 228 may manage the conditions associated with the payment token. The conditions may include the expiration time, restrictions on use (e.g., restricted use to specified recipients, categories of goods/services, etc.), and/or other types of restrictions. The condition manager 228 may determine whether the conditions are met upon receipt of the payment token from a recipient prior to providing the answer 130 to the recipient.

The authentication manager 230 may receive the payment request that includes the encrypted payment token and the security identifier. The authentication manager 230 may decrypt the payment request to identify the payment token and verify that the security identifier is correct (e.g., is associated with the payment token, etc.). When the security identifier is correct, the authentication manager 230 may verify that the conditions are satisfied using the condition manager 228 and that the account has the requested funds (e.g., an adequate balance or line of credit, etc.). When the conditions are met and the funds are available, the authentication manager 230 may approve the payment request 128.

The account manager 232 may transfer funds from an account of the user 106 to an account of the recipient 118. The account of the user may be stored in the account data 104. In some instances, the recipient may also have an account that is stored in the account data 104, but may instead (or also) have an account that is external to the host 102 and provided by a financial entity. For example, the account of the recipient may be an external deposit account managed by a financial entity that is different from the host 102.

Illustrative Operation

Figure 3:
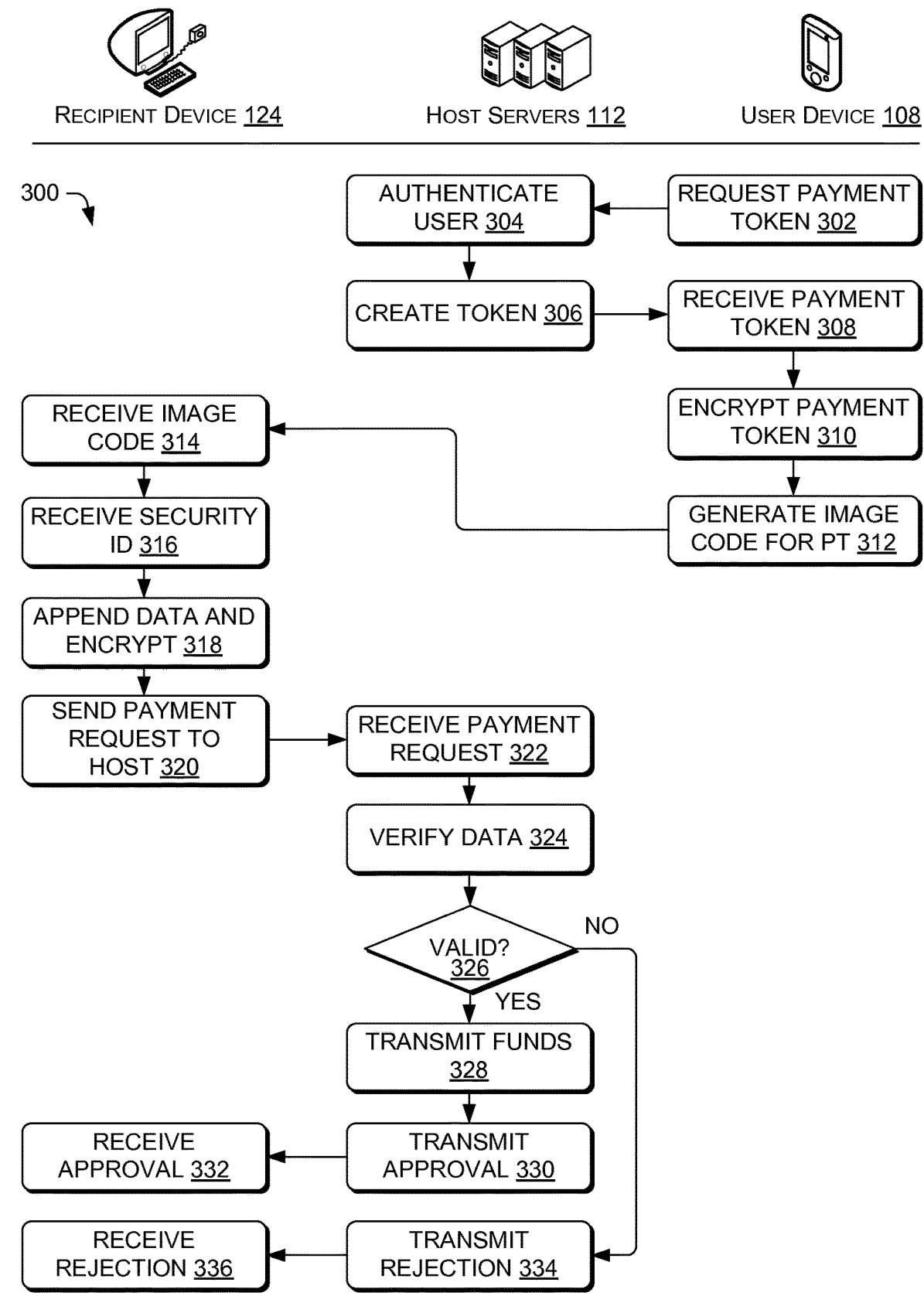
FIG. 3 is a flow diagram of an illustrative process to transmit a payment token during a payment process.
Figure 4:
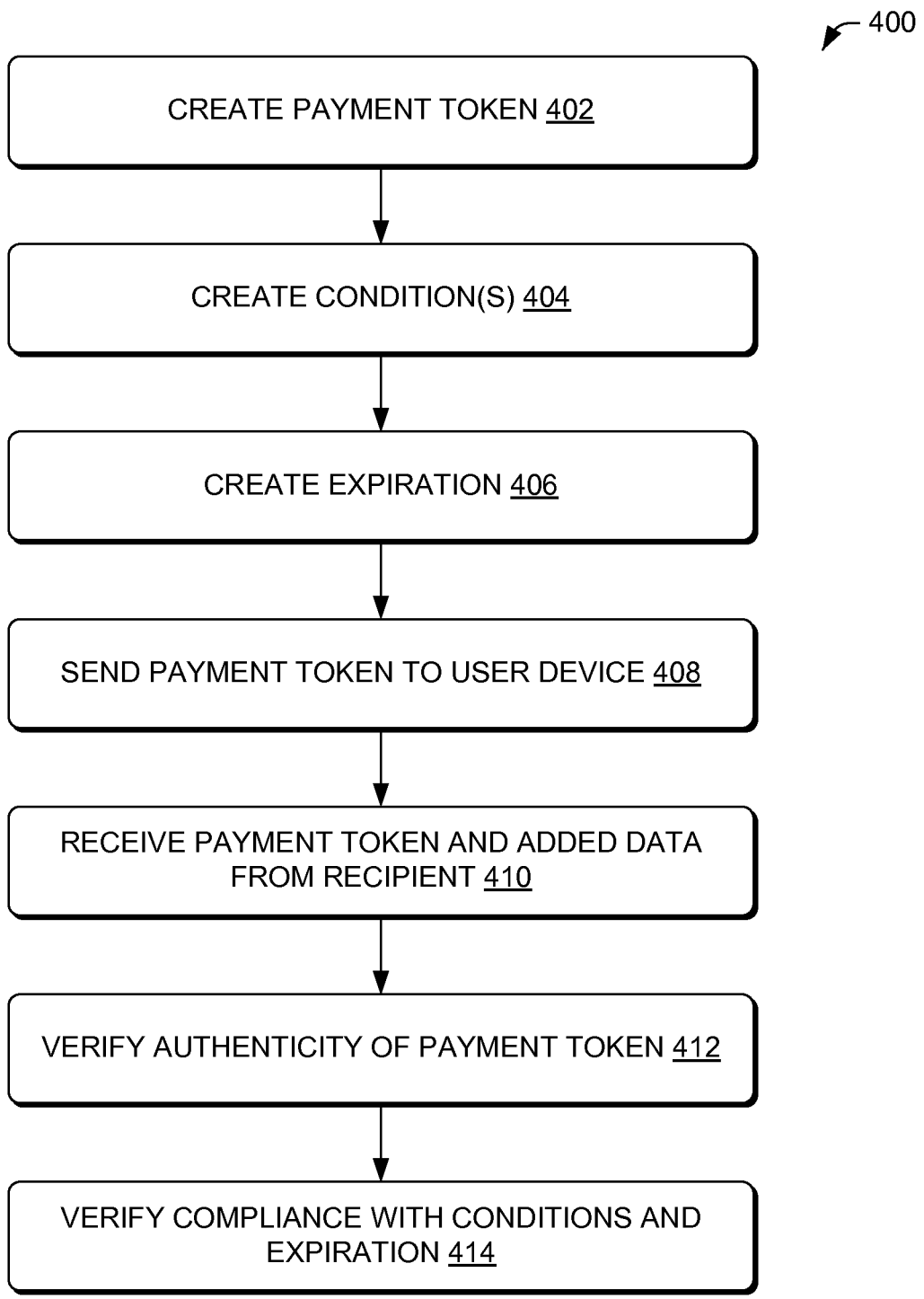
FIG. 4 is a flow diagram of an illustrative process to create and verify compliance with conditions and expirations associated with the payment tokens.
Figure 5:
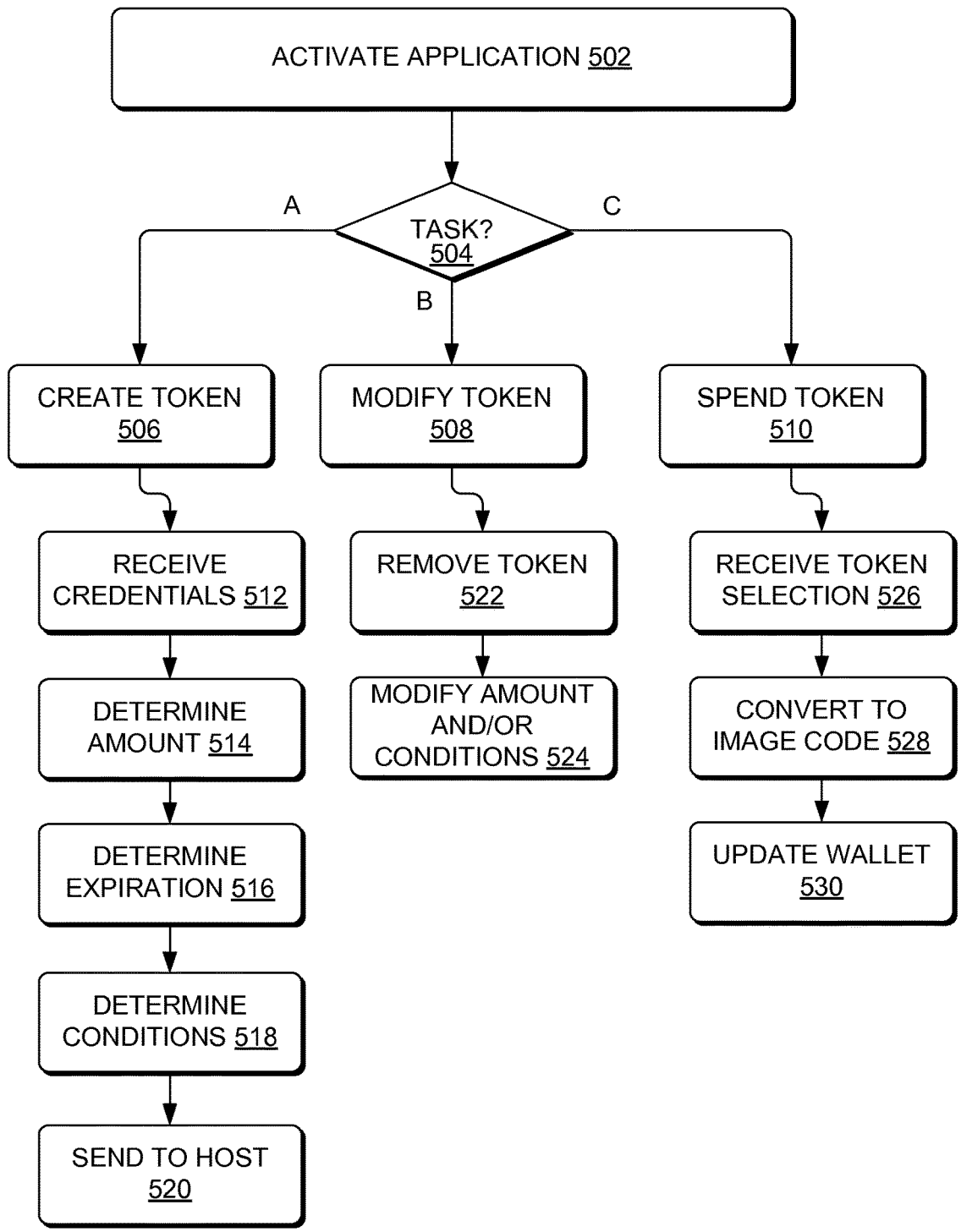
FIG. 5 is a flow diagram of an illustrative process to select and perform tasks to create, modify, and spend payment tokens.

FIGS. 3-5 show various processes related to creating, spending, and/or modifying payment tokens. The processes are illustrated as a collection of blocks in a logical flow graph, which represent a sequence of operations that can be implemented in hardware, software, or a combination thereof. In some instances, the collection of blocks is organized under respective entities that may perform the various operations described in the blocks. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 3 is a flow diagram of an illustrative process 300 to transmit a payment token during a payment process. The process 300 is described with reference to the environment 100 and may be performed by the user device 108. The recipient device 124, and the host servers 112. Of course, the process 300 may be performed in other similar and/or different environments.

At 302, the token requestor 210 may transmit the request 114 for a payment token to the host servers 112. The token requestor 210 may be accessed by the user device 108 or by another computing device. For example, the user 106 may initiate a request for the payment token using the user device 108 while standing in line at a brick-and-mortar store. In another example, the user 106 may initiate a request for a payment token using a computing device different than the user device 108, such as using a personal computer while at home before a shopping trip. The request 114 may include one or more of an expiration time, conditions for redemption, and an amount. In some embodiments, the expiration time, conditions, amount, or any combination thereof may have default values. In various embodiments, the host servers 112 may determine some or all of the expiration time, conditions, or amount. The conditions for redemption may include specified merchant locations, types of goods or services (including categories and/or specific items), or other types of conditions. The request 114 may also specify which account, payment types, and/or payment instruments to use to fund the payment token. The request 114 may also include user credentials to ensure that the request is valid and from the user 106.

At 304, the authentication manager 230 of the host servers 112 may authenticate the user 106 via the user credentials.

At 306, the token generator 226 of the host servers 112 may create the payment token 116. The payment token 116 may be a one-time use token that includes a unique identifier that is associated with an account of the user. The token generator 226 may associate the payment token with one or more payment accounts, payment instruments, and/or payment types when specified by the user in the request 114 or by default instructions. In various embodiments, the token generator 226 may encrypt the payment token. The token generator 226 may transmit the payment token to the user device 108, which may be received by the user device at 308.

In some embodiments, at 310, the code generator 212 on the user device 108 may encrypt the payment token.

At 312, the code generator 212 may generate the image code 120 for the payment token. The image code may be a bar code, a QR code, or another type of image code that may be read by a camera, scanner, or other image acquisition device of a recipient's computing device.

At 314, the recipient device 124, via the transaction manager 218, may receive the image code 120 using the image acquisition device 122. The transaction manager 218 may then convert the image code to the encrypted payment token, which may be alphanumeric data or another string of data.

At 316, the transaction manager 218 may receive the security identifier 126 from the user 106, such as a password, a PIN, or other types of security data. The security identifier 126 may be input by the user 106 into the recipient device 124 and/or input in the user device 108 and then transmitted to the recipient device from the user device.

At 318, the transaction manager 218 may append the security identifier with the payment token received from the user device 108 via the image code. The transaction manager 218 may also add a requested amount due to the recipient, data identifying the recipient, and/or other relevant data. The transaction manager 218 may also encrypt the security identifier, payment token, amount, and/or other data to create the payment request 128. To encrypt the data, the user device 108 and/or the recipient device 124 may have public keys issued by the host servers 112 for use to encrypt the data.

At 320, the transaction manager 218 may send the payment request 128 to the host servers 112, which may be received at 322.

At 324, the authentication module 230 of the host servers 112 may decrypt the data and verify that the data is valid (e.g., correct security identifier, valid payment token, requested amount does not exceed amount of payment token, etc.). When the data is valid at 326 (following the "yes" route from the operation 326), the account manager 232 may transmit funds to the recipient 118 from an account of the user 106 at 328. At 330, the gateway application 224 may transmit an approval message to the recipient device 124 to notify the recipient 118 of the payment. The recipient device 124 may receive the approval at 332. In some embodiments, the gateway application 224 may also transmit a confirmation or other data to the user device 108.

When the data is not valid at 326 (following the "no" route from the operation 326), then the gateway application 224 may transmit a rejection message to the recipient device 124 at 334. The recipient device 124 may receive the rejection at 336. In some embodiments, the gateway application 224 may also transmit a rejection or other data to the user device 108.

In some embodiments, the user device 108 may be restricted or unable to request the payment token at the operation 302. Instead, the user device 108 may only be able to spend tokens which are received by the user device following a request (i.e., the operation 302) transmitted from a different computing device (e.g., a portable computer, a laptop computer, etc.). By requiring a different device to request the payment token at 302, the user 106 may be less vulnerable to fraud if the user losses his or her user device because the user device 108 cannot be used to create new payment tokens. Thus, the user may only be at risk of loss of currently issued tokens following loss of the user device 108 in some embodiments. In some embodiments, the configuration of the user device 108 discussed above may allow a parent to provide an allowance to a child, an employer to provide a stipend to an employee, and so forth. Thus, the parent, employer, or other provider may request that the host 102 provide the payment tokens to another person (child, employee, etc.) without a risk that the other person will self-issue additional payment tokens using his/her user device because the user device may be configured to be unable to request payment tokens.

FIG. 4 is a flow diagram of an illustrative process 400 to create and verify compliance with conditions and expirations associated with the payment tokens. The process 400 may be performed by the host servers 112.

At 402, the token generator 226 may create a payment token for a user 106 in response to a request from the user.

At 404, the condition manager 228 may create conditions associated with the payment token created at the operation 402. The conditions may be created based on instructions or selections received from the user 106 in a request for the payment token, based on default instructions, based on heuristic data, or a combination thereof. For example, the condition manager may create tokens that are only good for recipients that the user 106 has interacted with in the past using the payment process 300 described with reference to FIG. 3.

At 406, the condition manager 228 may create an expiration time associated with the payment token created at the operation 402. In some instances, the expiration time may be assigned a relatively short amount of time to cause the payment token to expire if it is not used before the expiration time. For example, the expiration time may be a few minutes. This may be useful when the user 106 plans to spend the payment token right after requesting the payment token (e.g., user creates the token while in line at a merchant's store). In various instances, the expiration time may be assigned a longer amount of time, which may allow the user 106 to create tokens in advance of purchases. For example, the expiration time may be a few days to allow the user to create them in advance of a shopping trip. The payment tokens may then be stored and managed by the wallet module 208 of the payment application 206 on the user device 108.

At 408, the token generator 226 may send the payment token to the user device 108.

At 410, the gateway application 224 may receive the payment token, the security identifier, and other related data (e.g., amount due, etc.) as the payment request 128 from a recipient after the user 106 transfers (spends, redeems) the payment token to the recipient.

At 412, the authentication manager 230 may verify an authenticity of the payment token. The authentication manager 230 may decrypt the payment request to identify the payment token and the security identifier. The authentication manager 230 may then verify that the payment token has not been redeemed, is a valid token, and that the security identifier is correct.

At 414, the condition manger 228 may verify compliance with the conditions and the expiration time per the conditions created at the operation 404 and the expiration time created at the operation 406. The condition manager 228 may also verify that the amount of the payment request does not exceed the amount of the payment token created at 402 or an amount of available funds in an account associated with the payment token. When the conditions are satisfied and the payment token has not expired, then the condition manager 228 may authorize the account manager to fulfill the payment request for the amount specified by the recipient as long as the amount does not exceed the amount of the payment request and funds are available in the associated account of the user 106.

FIG. 5 is a flow diagram of an illustrative process 500 to select and perform tasks to create, modify, and spend payment tokens. The process 500 may be performed by the user device 108.

At 502, the user device 108 may activate the payment application 206. The payment application 206 may be an application (or "app"), widget, component, or other software executable by the user device and configured to interact with the host servers 112 and the recipient device 124 to facilitate payments using payment tokens as described here.

At 504, the wallet module 208 may determine a task to complete using the payment application 206. The tasks may be selected from a task to create a payment token at 506 via route "A", a task to modify a payment token at 508 via route "B", and a task to spend a payment token at 510 via route "C". Each task is described in turn.

At 506, the wallet module 208 may create the payment token using the token requestor 210. At 512, the wallet module 208 may receive user credentials as a security measure (or additional security measure) to determine whether the user is authorized to create the payment token. At 514, the wallet module 208 may determine an amount for the payment token. The user 106 may specify the amount or a default value may be used for the payment token. At 516, the wallet module 208 may determine a desired expiration time of the payment token, which may be set by the user, populated by default data, or deferred to the host 102. At 518, the wallet module 208 may determine conditions for the payment token. Conditions may be created from user input by the user 106, by rules from the server 102, or both. At 520, the token requestor 210 may send the request to the host servers 112.

At 508, the wallet module 208 may modify an existing payment token. The modification may remove the payment token at 522 or change one or more attributes (e.g., conditions, expiration, etc.) of the payment token at 524 created via the operations 512 to 518. In some embodiments, the operation may require the user credentials using an operation similar to the operation 512.

At 510, the wallet module 208 may spend a payment token created via the operations 506 to 520. At 526, the wallet module 208 may receive a selection of an available payment token. For example, the user 106 may select from a number of available payment tokens stored by the wallet module 208. At 528, the code generator may convert the payment token into an image code to allow a recipient to obtain the payment token from the user device 108. At 530, the wallet module 208 may update the wallet such as by removing the token (that was selected at the operation 526) from the wallet after the operation 528.

Illustrative Interface

Figure 6:
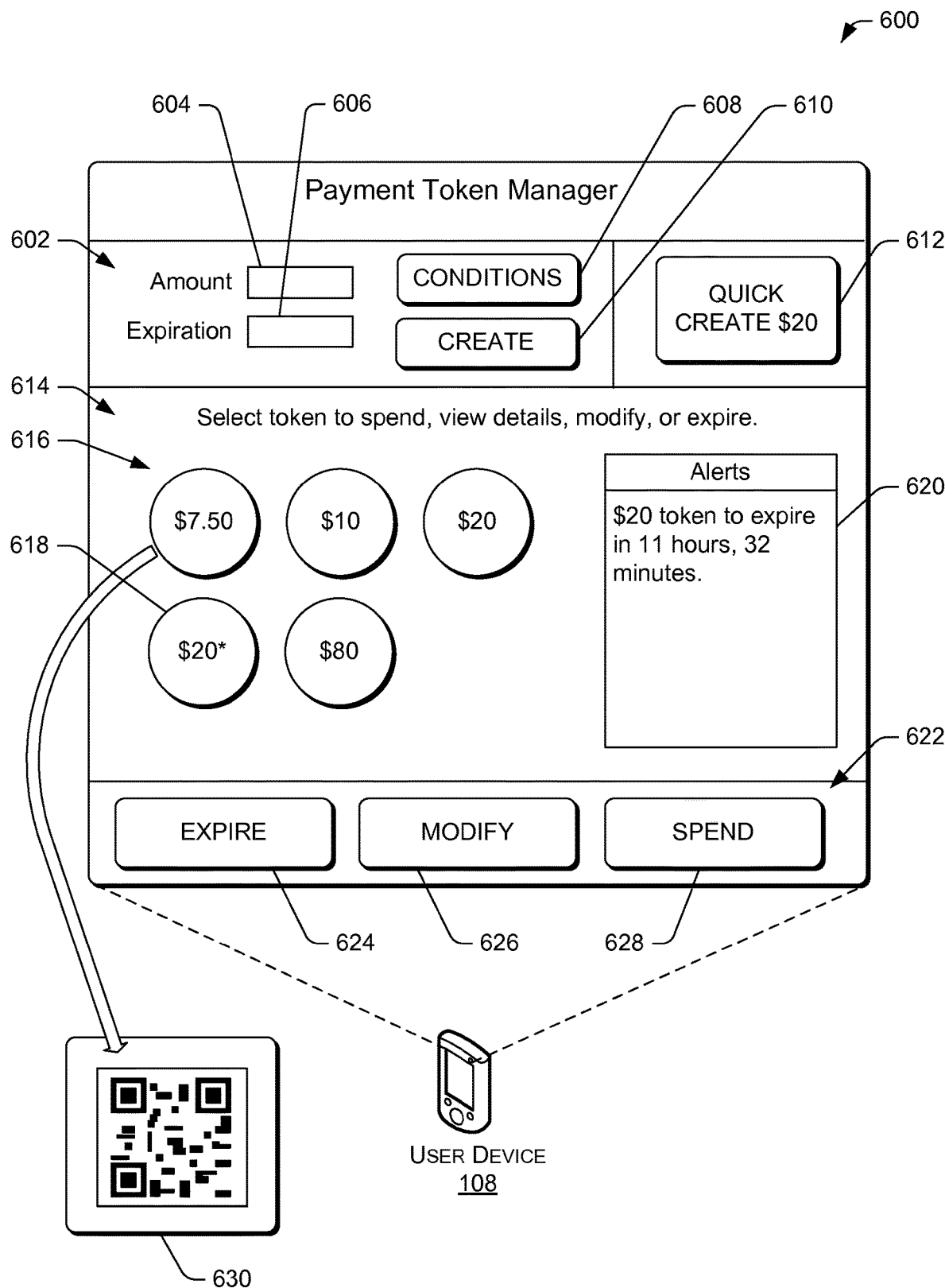
FIG. 6 is an illustrative user interface (UI) that enables a user to create, modify, and spend payment tokens.

FIG. 6 is an illustrative user interface (UI) 600 that enables a user to create, modify, and spend payment tokens. The UI 600 may be presented by the payment application 206 and displayed by the user device 108. While FIG. 6 illustrates one example UI, it is to be appreciated that multiple other graphical or non-graphical user interfaces may be employed to create, modify, and/or spend payment tokens.

In some embodiments, the UI 600 may include a create payment token section 602 that allows the user 106 to create a payment token via a request to the host servers 112. The create payment token section 602 may include an amount field 604 and an expiration time field 606. The create payment token section 602 may also include a conditions command 608 to allow the user to create conditions for the payment token. A create command 610 may be used to initiate the request for the payment token following input in the create payment token section 602.

The UI 600 may also include a quick create command 612 to enable the user to quickly request a payment token for a default amount and that includes default conditions (including a default expiration time). In response or prior to selection of the quick create command 612 and/or the create command 610, the UI 600 may prompt the user 106 to provide user credentials such as a username and password or other security data.

The UI 600 may include a wallet section 614 that includes available payment tokens 616 that have been created by requests. Each payment token may have an associated amount or maximum value, expirations, and/or conditions. For example, a payment token 618 may include conditions denoted by a "*" next to the amount of the payment token.

The wallet section 614 may also include alerts 620 that indicate information about the available payment tokens 616 or other information. The available payment tokens 616 may be organize by amount, by expiration, by user preference, or in other ways.

A command section 622 may include an expire command 624 to delete or expire a payment token, a modify command 626 to modify a payment token in accordance with the operation 508, and a spend command 628 to redeem one of the available payment tokens 616 via the operation 510. For example, the user 106 may select a payment token that the user desires to spend or redeem. The code generator 212 may create an image code for the selected payment token, which may be displayed by the user device 108 via an image code window 630 (e.g., over or in the UI 600, etc.).

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method comprising:
   receiving, by one or more computing devices, a request for a one-time use payment token that is redeemable with a plurality of recipients, the request specifying at least a user account, an amount, and an expiration of the one-time use payment token, the expiration being specific to the one-time use payment token;
   verifying, by at least one of the one or more computing devices, that the user account has an amount of funds available that is at least equal to the amount specified in the request;
   generating, by at least one of the one or more computing devices, the one-time use payment token as a number that is associated with the user account and is available for one-time use with any recipient of the plurality of recipients prior to the expiration specified by the request for the one-time use payment token;
   transmitting the one-time use payment token to a user device associated with the user account;
   receiving, after redemption of the one-time use payment token, a payment request from a particular recipient of the plurality of recipients, wherein the payment request is encrypted and wherein the payment request includes at least the one-time use payment token and a requested amount;
   decrypting the payment request to identify at least the one-time use payment token and the requested amount; and
   causing the requested amount to be transferred from the user account to an account of the particular recipient based at least in part on determining that the one-time use payment token is valid and has not previously been received as part of a different payment request, that the one-time use payment token has not expired based on the expiration, and that the requested amount does not exceed the amount of the one-time use payment token.

2. The method as recited in claim 1, wherein the payment request further specifies a security identifier received from user input and associated with one-time use payment token or the user account, and wherein the transferring the requested amount to the account of the particular recipient is contingent on the security identifier being a correct security identifier for the one-time use payment token or the user account.

3. The method as recited in claim 1, further comprising receiving at least one condition for usage of the one-time use payment token, the at least one condition being stored by a host and verified, by verifying that the redemption satisfies the at least one condition, prior to the transferring the requested amount to the account of the particular recipient.

4. The method as recited in claim 1, wherein the request for the one-time use payment token further specifies user credentials associated with a user, and further comprising authenticating the user based at least in part on the user credentials prior to the generating the one-time use payment token.

5. The method as recited in claim 1, further comprising:
   receiving a plurality of additional requests for respective additional one-time use payment tokens, individual ones of the additional requests specifying at least the user account, a respective amount, and a respective expiration for the respective additional one-time use payment token; and
   generating, by the one or more computing devices, the additional respective one-time use payment tokens such that the individual ones of the respective additional one-time use payment tokens are valid for a one-time use prior to the respective expiration specified by the respective additional request.

6. A method, comprising:
   receiving, by one or more computing devices, a request for a one-time use payment token that is redeemable with a plurality of recipients, the request specifying a user account, an amount of the one-time use payment token and an expiration for the one-time use payment token, the expiration being specific to the one-time use payment token;
   transmitting, by at least one of the one or more computing devices, the one-time use payment token to a user device associated with the user account at a time at which the user account contains an amount of available funds that at least equals the amount of the one-time use payment token specified in the request;
   receiving, by at least one of the one or more computing devices, a payment request from a particular recipient after redemption of the one-time use payment token, the payment request specifying at least the one-time use payment token and a requested amount; and
   causing, by at least one of the one or more computing devices, the requested amount to be transferred from the user account to an account of the particular recipient at least partly in response to determining that the one-time use payment token is valid and has not previously been received as part of a different payment request, that the requested amount does not exceed the amount of the one-time use payment token, and that the one-time use payment token has not expired based on the expiration.

7. The method as recited in claim 6, wherein the user account has an amount of funds available that at least equals the amount of the one-time use payment token specified in the request when: (i) the user account has an available balance that is greater or equal to the amount of the one-time use payment token specified in the request, (ii) the user account has an available credit limit that is greater or equal to the amount of the one-time use payment token specified in the request, or (iii) the user account has an available balance and a credit limit that, when combined, is greater or equal to the amount of the one-time use payment token specified in the request.

8. The method as recited in claim 6, further comprising receiving at least one condition for usage of the one-time use payment token, satisfaction of the condition being verified prior to the transferring the requested amount to the account of the particular recipient.

9. The method as recited in claim 8, wherein the at least one condition limits redemption of the one-time use payment token for a specified group of recipients.

10. The method as recited in claim 8, wherein the at least one condition limits redemption of the one-time use payment token for a specified item or service or for a specified group of items or services.

11. The method as recited in claim 6, wherein the payment request further specifies a security identifier associated with the user account, and wherein the transferring the requested amount to the account of the particular recipient is contingent on the security identifier being a correct security identifier for the user account.

12. The method as recited in claim 6, further comprising authenticating the request for the one-time use payment token prior to a generating of the one-time use payment token.

13. The method as recited in claim 12, wherein the authenticating the request is based on at least one of user credentials or an internet protocol (IP) address of a device that requests the one-time use payment token.

14. The method as recited in claim 6, wherein the payment request is encrypted upon receipt, and further comprising decrypting the payment request to identify at least the one-time use payment token and the requested amount.

15. The method as recited in claim 6, further comprising:
 receiving a plurality of additional requests for additional one-time use payment tokens, individual ones of the additional requests specifying at least the user account, a respective amount, and a respective expiration for the respective additional one-time use payment token; and
 generating, by the one or more computing devices, the additional one-time use payment tokens such that individual ones of the additional one-time use payment tokens is valid for a one-time use prior to the respective expiration specified by the respective additional request.

16. One or more non-transitory computer-readable media storing computer-executable instructions that, when executed on one or more processors, perform acts comprising:
 receiving a request for a one-time use payment token that is redeemable with a plurality of recipients, the request specifying a user account, an amount of the one-time use payment token and an expiration for the one-time use payment token, the expiration being specific to the one-time use payment token;
 transmitting the one-time use payment token to a user device associated with the user account;
 receiving a payment request from a particular recipient of the plurality of recipients after redemption of the one-time use payment token, the payment request specifying at least the one-time use payment token and a requested amount; and
 causing the requested amount to be transferred from the user account to an account of the particular recipient at least partly in response to determining that the one-time use payment token is valid and has not previously been received as part of a different payment request, that the requested amount does not exceed the amount of the one-time use payment token, and that the one-time use payment token has not expired based on the expiration.

17. The one or more non-transitory computer-readable media as recited in claim 16, wherein the payment request further specifies a security identifier associated with the user account, and wherein the transferring the requested amount to the account of the particular recipient is contingent on the security identifier being a correct security identifier for the user account.

18. The one or more non-transitory computer-readable media as recited in claim 16, wherein the payment request is encrypted upon receipt, and further comprising decrypting the payment request to identify at least the one-time use payment token and the requested amount.

19. The one or more non-transitory computer-readable media as recited in claim 16, the acts further comprising receiving at least one condition for usage of the one-time use payment token, satisfaction of the condition being verified prior to the transferring the requested amount to the account of the particular recipient.

20. The one or more non-transitory computer-readable media as recited in claim 19, wherein the at least one condition:
 limits redemption of the one-time use payment token for a specified group of recipients; or
 limits redemption of the one-time use payment token for a specified item or service or for a specified group of items or services.

\* \* \* \* \*